United States Patent [19]

Lucas

[11] Patent Number: 4,474,211

[45] Date of Patent: Oct. 2, 1984

[54] PRESSURE AND VACUUM RELIEF VALVE WITH DEBRIS-CATCHING FEATURE

[76] Inventor: Joseph F. Lucas, Rte. 1, Box 362, Portland, Oreg. 97231

[21] Appl. No.: 350,079

[22] Filed: Feb. 18, 1982

[51] Int. Cl.³ .............................................. F16K 7/17
[52] U.S. Cl. ................................ 137/599.2; 137/854; 137/513.5
[58] Field of Search ................... 137/599.2, 547, 199, 137/854, 197, 513.3, 513.5, 517

[56] References Cited

U.S. PATENT DOCUMENTS

| | | | |
|---|---|---|---|
| 685,169 | 10/1901 | Paul | 137/599.2 X |
| 2,352,307 | 4/1942 | Arey | 137/599.2 X |
| 3,267,960 | 8/1966 | Warburton | 137/517 |
| 3,454,182 | 7/1969 | Morton | 137/513.5 |

*Primary Examiner*—Martin P. Schwadron
*Assistant Examiner*—Stephen M. Hepperle

*Attorney, Agent, or Firm*—Kolisch, Hartwell, Dickinson & Anderson

[57] ABSTRACT

A liquid-flow control valve with pressure-sensitive gas-bleed apparatus having a debris-catching feature. Included is a disc sealingly seatable selectively against a valve seat to open and close the valve. Apertures, which extend through the disc, remain open when the disc is seated on the seat. An aperture closure device, disposed adjacent the disc on the side from which fluid normally flows, has a pressure-responsive flex web biased by natural internal relaxed-state memory to form, in cooperation with the disc, a cavity which communicates with the apertures. The web has openings which are offset from the apertures when viewed along the adjustment axis of the valve and which communicate with the cavity. The web is moveable under the influence of liquid pressure from within the body toward the disc to collapse the cavity and to close the apertures when the disc is seated on the seat.

2 Claims, 3 Drawing Figures

PRESSURE AND VACUUM RELIEF VALVE WITH DEBRIS-CATCHING FEATURE

BACKGROUND AND SUMMARY OF THE INVENTION

This invention pertains to a pressure and vacuum relief valve and particularly, to such a valve constructed to have debris-catching openings.

Although it is anticipated that this invention could be used in various applications, the preferred embodiment is intended for use with irrigation lines. It is common practice in irrigating large fields, particularly with sprinkler-type irrigation, to employ a supply line extending along one edge of a field. From this supply line, lateral lines extend across the field. Standpipes with sprinkler heads are attached to the lateral lines for irrigation of an elongate strip of the field. The lateral line is periodically moved from one lateral outlet to another to effect irrigation of the entire field.

Between irrigations the various lines are drained of water. As the water supply is turned on, the resident air must be vented in order to allow the water to fill the lines. Since the valves at the lateral junctions are normally closed one or more of them must be opened to allow the air to escape.

Pressure and relief valves have been developed in order to overcome this problem. Such a valve, when closed, allows air to escape through apertures in a seal-forming disc. When water from the supply source comes in contact with the valve, the air-bleeding apertures are closed by a flexible web which is forced against the disc.

After irrigation, water is drained from the lines. As the water pressure is removed, the web flexes away from the disc. This allows air from the lateral line to replace the water in the supply line. A vacuum, which would otherwise develop, is thereby prevented. Thus, as irrigation lines are drained and filled, air automatically fills and empties the lines as necessary to accommodate the corresponding movement of water within the lines.

However, one problem inherent in the pressure and vacuum relief valve system just described is the plugging of the relief valve mechanism with debris carried in the water. During filling, as water surges through the supply lines and into a valve, some of the water escapes through the relief valve aperture before the web closes. It is debris carried in this water which may become lodged in the relief valve. When this happens, a complete seal is prevented and water leaks into the lateral line.

It is the purpose of this invention to provide a pressure and vacuum relief valve which overcomes the problem of the prior art described above.

Specifically, it is an object to provide such a relief valve which provides for the capture of such debris before it can get into the seal-forming components of the valve.

It is also an object of this invention to provide such a device which incorporates the debris-catching feature into the flexible web, thereby precluding the requirement for adding other devices to a valve beyond the minimum required.

Such a device is provided by the preferred embodiment of this invention. It includes a resilient aperture-closure web which, when in a relaxed condition, forms a cavity in cooperation with the aperture-containing disc. Openings in the web and the apertures communicate with the cavity to form a passageway for air when water is not in the valve body. When water under pressure comes into the body, that pressure causes the cavity to collapse, closing the aperture. Any debris in the water is caught in the openings before it can get into the cavity or the aperture.

These and additional objects and advantages of the present invention will be more clearly understood from a consideration of the drawings and the following detailed description of the preferred embodiment.

DETAILED DESCRIPTION OF THE INVENTION

Figure 1:
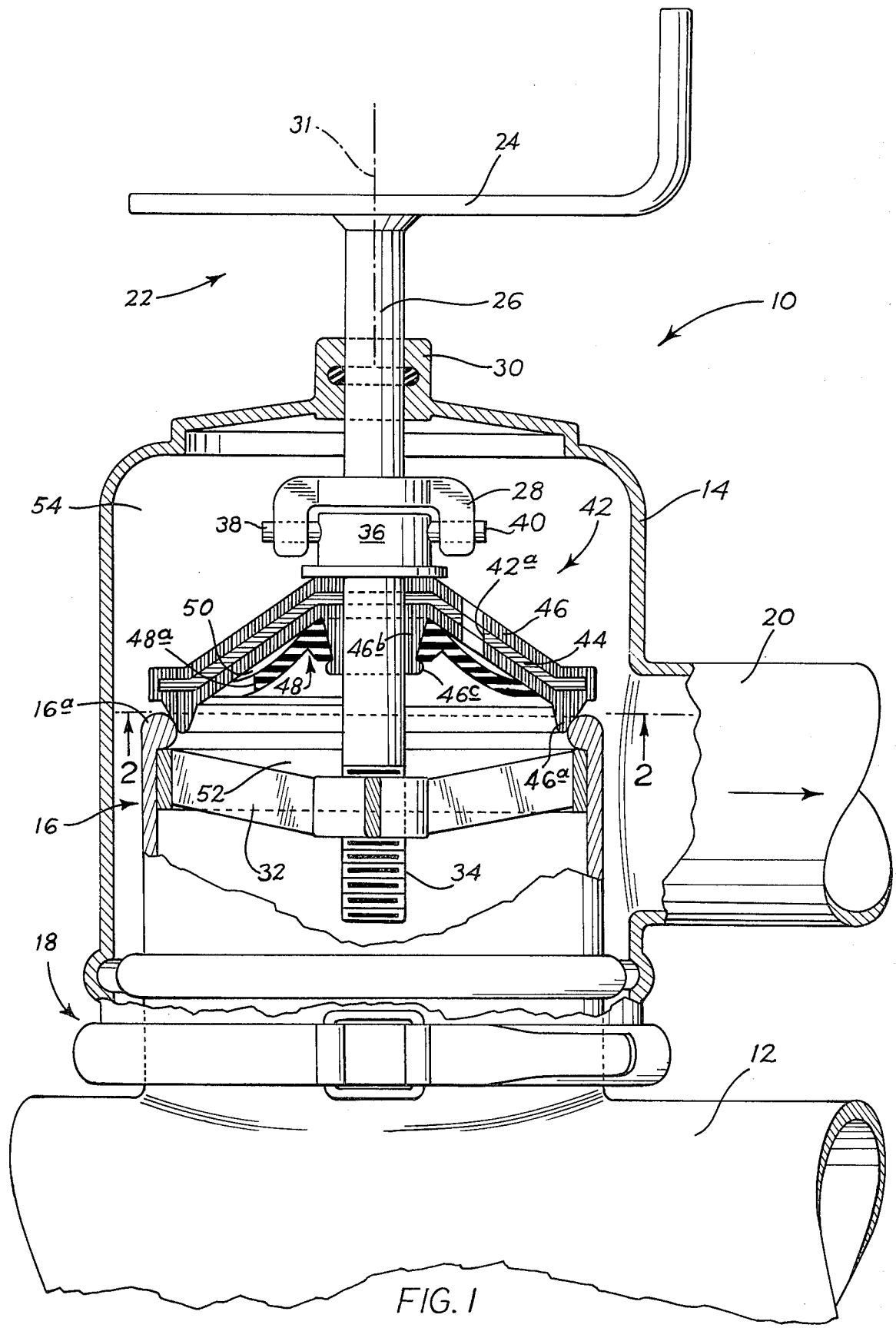
FIG. 1 is a fragmentary cross-sectional view, taken along two planes relative to the valve adjustment axis, of a valve made in conformance with this invention.
Figure 2:
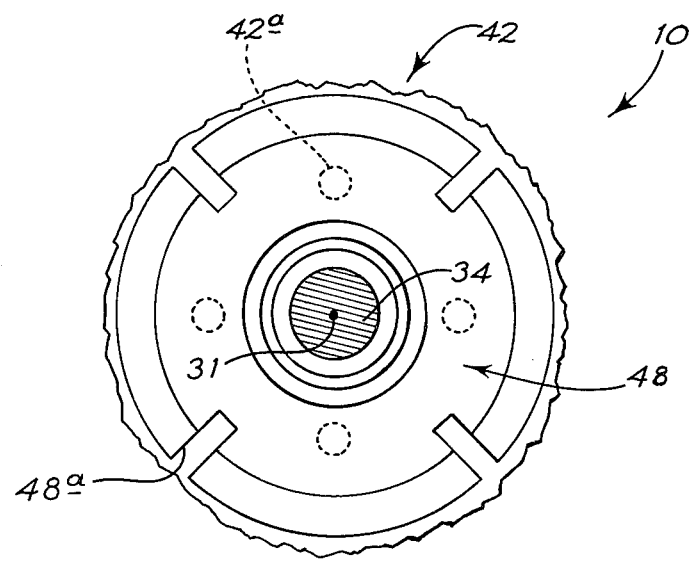
FIG. 2 is a fragmentary view taken along line 2—2 in FIG. 1.

Explaining the structure of a valve made in conformance with this invention and referring initially to FIG. 1, shown generally at 10 is a pressure and vacuum relief valve attached to a supply line 12. Valve 10 includes a body having an outer housing 14 and an inner base 16, which are joined sealingly together by a conventional coupling, shown generally at 18. The coupling allows for the removal of housing 14 for use on other lateral line outlet valves. An outlet 20 joined to housing 14 provides for connection with an irrigation line through the use of other couplings not shown. Mounted in the top of housing 14 is a crank shown generally at 22 which includes a handle 24, a connecting rod 26 and a connector 28.

Rod 26 extends slidingly through a sealed bushing 30 and is rotatable about a valve adjustment axis 31.

Base 16 is cylindrical in shape and has an enlarged lip around its upper edge which forms a valve seat 16a also referred to herein as valve-seat-defining means. A spider-shaped stem support 32 is mounted on base 16 and has a threaded bore 32a located at its center. Bore 32a is sized for receipt of a threaded stem 34 which extends coaxially with rod 26 from below support 32 up to connector 28. Stem 34 is connected fixedly at its upper end to enlarged cylindrical head 36. Extending radially outwardly from head 36 are a pair of extensions 38, 40 which are received drivingly in connector 28. Rotation of crank 22 in either direction about axis 31 causes a corresponding rotation of stem 34.

A disc or closure element, shown generally at 42, is mounted on stem 34. Disc 42 includes a metal core 44 which is encapsulated in a resilient coating such as vulcanized rubber. Extending vertically through disc 42 are plural apertures, such as aperture 42a. Coating 46 is shaped along its lower periphery with a downward extending rim 46a which is made to conform with seat 16a to form a seal therewith when valve 10 is closed. The central portion of coating 46 also includes a downward extending cone 46b, which cone terminates in a collar-like enlargement 46c, as shown.

Disposed below disc 42 is an aperture closure device 48 which has a saucer shape and an inner tapered hole which is sized for snug receipt of cone 46b, as shown in the figures. Enlargement 46c acts as a keeper preventing removal of device 48 from cone 46b. The cross-sectional view of device 48 in FIG. 1 shows that, in a relaxed-state condition, the surface adjacent disc 42 seats thereagainst at its inner and outer margins. An intermediate region is concave with respect to the disc. Device 48 is made of a resilient material such as vulcanized rubber. The concave expanse of device 48 acts as a flexible web, the use of which will be explained shortly. The concave portion of device 48 and disc 42 form a cavity 50 which communicates with apertures 42a. In the embodiment shown in the figures, four apertures exist with a single cavity connecting all of them. Notches in the periphery of device 48, such as notch 48a, also referred to herein as openings, are disposed axially offset from the apertures in disc 42. It is preferable that the notches be equal to or smaller in size than the apertures.

Figure 3:
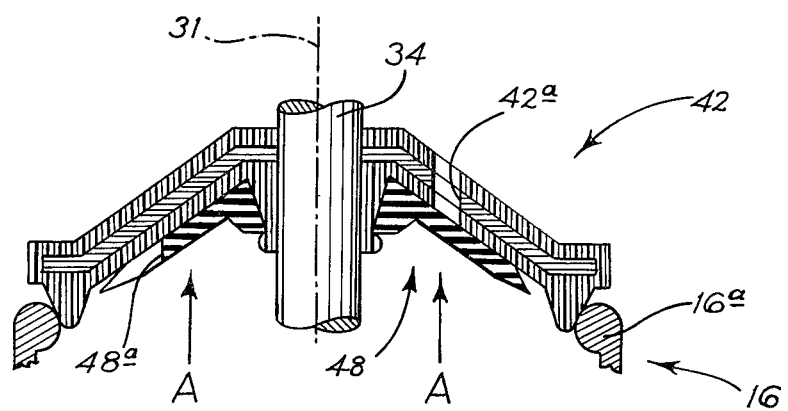
FIG. 3 shows a fragmentary cross-sectional view similar to a portion of FIG. 1 showing the invention when water in the valve body exerts pressure on the valve.

During normal operation, valve 10 is closed by turning crank 22 clockwise when viewed from the top of FIG. 1. This causes stem 34 to move downward through structure 32. Disc 42 is thereby pressed against seat 16a, closing off outlet 20 from supply line 12. At this point valve 10 has a supply line-side chamber 52 which is separated from a lateral line-side chamber 54. As can be seen, these chambers are separated by disc 42. In this state, which is shown in FIG. 1, the lines and valve 10 only contain air. As water is allowed to enter line 12, the air contained therein is forced upwardly through the passageway formed by notch 48a, cavity 50, and aperture 42a. Thus, the air can escape into the lateral line without a substantial amount of pressure building up in the line. When the supply line fills with water, the water presses against the concave or lower side of device 48 causing cavity 50 to collapse. This condition is shown in FIG. 3 with the direction of water force indicated by the arrows marked as "A". The normally curved flexible web portion of device 48 is flush against the adjoining surface of disc 42. This closes aperture 42a, preventing the transmission of water therethrough. Thus, a complete seal against water transmission is provided. During the short time period when the last air escapes from chamber 52 and the first flow of water enters, a little water escapes through aperture 42a. However, any debris that is in the water is captured by notches 48a and prevented from entering cavity 50 or aperture 42a. Since notch 48a is smaller, generally, than cavity 50 or aperture 42a, any debris that does get through, will be able to pass through aperture 42a or be small enough not to prevent a complete closure of aperture 42a.

It can be seen that aperture 42a and notch 48a cannot overlap. If they did, it would not be possible to form a complete seal when water is introduced into the valve.

After irrigation has been completed, water is drained from the supply line. At this time a vacuum is created in chamber 52 which is relieved by the return of device 48 to the position shown in FIG. 1, allowing passage of water and air from chamber 54 to relieve the vacuum.

Any debris that may have been captured in notch 48a is removed with the reverse flow of water and air.

While the invention has been particularly shown and described with reference to the foregoing preferred embodiment, it will be understood by those skilled in the art that other changes in form and detail may be made therein without departing from the spirit and scope of the invention as defined in the following claims.

It is claimed and desired to secure by Letters Patent:

1. A fluid-flow control valve with automatic-pressure-actuated low-pressure-fluid-bleed means, said valve in operative condition comprising
   a valve body including means defining a generally upwardly facing valve seat,
   a closure element disposed above said seat, mounted on said body for selective adjustment along an axis toward and away from said seat to close and open said valve, respectively, said element having an aperture, spaced from said axis, which remains at least partially open with said element seated on said seat, and
   an aperture closure device disposed below said element including a pressure-responsive flex web, extending across said aperture, biased by natural internal relaxed-state memory to form, in cooperation with said element, a cavity communicating with said aperture on the underside thereof, said web having an opening displaced from said aperture as viewed along the adjustment axis of the valve, said opening communicating with said cavity,
   said web being moveable, under the influence of fluid pressure from within said body, toward said element to collapse said cavity and to close said aperture, with said element seated on said seat.

2. A liquid-flow control valve with automatic-pressure-actuated gas-bleed means, said valve in operative condition comprising
   a valve body including means defining a generally upwardly facing valve seat,
   a circular disc disposed above said seat, mounted on said body for selective adjustment toward and away from said seat to close and open said valve, respectively, said disc having an aperture, spaced from the axis of said disc, which remains open with said disc seated on said seat, and
   a generally circular aperture closure device disposed co-axially with and below said disc including a pressure-responsive flex web, extending across said aperture, biased by natural internal relaxed-state memory to form, in cooperation with said disc, a cavity communicating with said aperture on the underside thereof, said web having at least one notch along its periphery communicating with said cavity and being moveable, under the influence of liquid pressure from within said body, toward said disc to collapse said cavity and to close said aperture, with said disc seated on said seat.

* * * * *